United States Patent [19]

Davis et al.

[11] 4,293,863

[45] Oct. 6, 1981

[54] INK JET PRINTER WITH LATERALLY MOVABLE PRINT HEAD

[75] Inventors: James W. Davis, Richardson; Suresh C. Paranjpe, Dallas, both of Tex.

[73] Assignee: The Mead Corporation, Dayton, Ohio

[21] Appl. No.: 75,056

[22] Filed: Sep. 12, 1979

[51] Int. Cl.[3] .............................................. G01D 15/18

[52] U.S. Cl. ................................ 346/75; 346/139 R; 400/126; 400/320

[58] Field of Search ............ 346/75, 139 R; 400/126, 400/320, 328

[56] References Cited

U.S. PATENT DOCUMENTS

| | | | |
|---|---|---|---|
| 3,136,594 | 6/1964 | Ascoli | 346/75 X |
| 3,373,437 | 3/1968 | Sweet | 346/75 |
| 3,689,693 | 9/1972 | Cahill | 346/75 X |
| 3,701,998 | 10/1972 | Mathis | 346/75 |
| 3,833,891 | 9/1974 | Howard | 364/900 |
| 4,069,485 | 1/1978 | Martin | 346/75 |
| 4,112,469 | 9/1978 | Paranjpe | 346/75 X |

*Primary Examiner*—Joseph W. Hartary
*Attorney, Agent, or Firm*—Biebel, French & Nauman

[57] ABSTRACT

An ink jet printer deposits ink drops from a plurality of jet drop streams along a plurality of parallel adjacent print lines on a sheet of paper. The printer includes a sheet supporting drum, means for rotating the drum, and a print head which is slidably mounted adjacent the drum for linear movement in a direction parallel to the axis of rotation of the drum. A rotatable cam defines a continuous endless camming surface with the cam being driven by a drive arrangement interconnected with the means for rotating the drum. A cam follower means follows the continuous camming surface and moves the print head in a direction parallel to the axis of rotation of the paper supporting drum such that jet streams are directed to deposit drops along respective ones of the print lines during successive rotations of the drum.

14 Claims, 4 Drawing Figures

INK JET PRINTER WITH LATERALLY MOVABLE PRINT HEAD

BACKGROUND OF THE INVENTION

The present invention relates to ink jet printers and, more particularly, to a printer in which the ink jet print head is shifted parallel to the axis of rotation of a sheet supporting drum during a plurality of rotations of the drum.

Ink jet printers, and the mechanisms by which drops in a plurality of jet drop streams are selectively charged and deflected to produce a print image, are well known and are illustrated in patents such as U.S. Pat. No. 3,701,998, issued Oct. 31, 1972, to Mathis, and U.S. Pat. No. 3,373,437, issued Mar. 12, 1968, to Sweet et al. Typically, such printers include a print head which generates a plurality of jet drop streams, which streams may be positioned in one or more rows. The print head includes a charge electrode arrangement which selectively induces charges upon the drops in the streams. The charged drops are deflected by an electric field while the uncharged drops pass through the field unaffected. Thus, the charged and uncharged drops are separated into two sets of trajectories. A catcher arrangement is provided in the path of one of the sets of trajectories, with the drops in the other set of trajectories striking a print receiving medium. Printers such as shown in the Mathis patent have utilized a plurality of rows of jet drop streams with the print lines serviced by each of the rows interlacing with those serviced by the others of the rows. This permits high resolution printing to be accomplished on a continuous web of paper or other print receiving material. While such a single pass printing operation provides high printing speed, it may not be particularly advantageous in a printing situation in which extremely high speed printing is not required.

As shown in U.S. Pat. No. 4,112,469, issued Sept. 5, 1978, to Paranjpe et al, the lower printing speed requirements of a copier permit each sheet of copy paper to be printed as the sheet is moved repeatedly past the print head on a rotating drum. In the Paranjpe et al copier, an array of printing nozzles is moved axially along the rotating drum for printing during a plurality of rotations. Simultaneously, an optical scanning system scans an original document and sweeps the image of the document across an array of photosensors arranged to correspond in relative position to the array of printing nozzles. Output signals from the photosensors are supplied to a control unit which controls the printing operation of the nozzles. The nozzles are rather widely spaced, but their spacing is adjusted in accordance with the number of nozzles and with the speed of movement of the print head such that helical print lines, serviced during each rotation of the drum, interlace with previously and subsequently serviced print lines to produce an interlaced, solid printed copy.

Such an arrangement provides significant simplification of the copying apparatus. For example, if a single copy is printed during N rotations of the sheet supporting drum, the number of optical sensors and nozzles required is reduced by a factor of N, as compared with the number of sensors and nozzles which would be required for printing during a single rotation of the drum. Additionally, the control and signal processing circuitry required for the copying apparatus is correspondingly simplified.

In the Paranjpe et al copying device, the sheet supporting drum is rotated by a servo motor controlled by a central control circuit. The print head is mounted on a threaded shaft which is rotated by a second servo motor, which also controls lateral shifting of the optical scanning apparatus. While servo motor control of the print head position with respect to the rotational position of the drum is extremely accurate along the entire path of movement of the print head, small fluctuations in print head position affect significantly the quality of the printed copy. While few such inaccuracies may occur during printing of a copy, if the print lines are not positioned accurately, narrow unprinted strips may be apparent in the printed copy.

U.S. Pat. No. 3,689,693, issued Sept. 5, 1972, to Cahill et al, discloses a plurality of print heads which generate a plurality of jet drop streams positioned in a row, with the streams widely spaced apart and a stepping motor arrangement for shifting the print heads parallel to the axis of rotation of a paper supporting drum. The print heads are intermittently stepped laterally by a relatively small distance after each rotation of the drum such that each jet drop stream prints along a plurality of adjacent print lines on the sheet. Each jet drop stream therefore prints a band of print lines, with adjacent bands being printed by adjacent jet drop streams. The stepping motor arrangment for shifting the print heads is subject to the same position errors discussed above with respect to the Paranjpe et al copier.

Another multiple jet, ink jet printer utilizing printing of a sheet during a plurality of rotations of a drum upon which the sheet is mounted is disclosed in U.S. Pat. No. 4,069,485, issued Jan. 17, 1978, to Martin. The Martin printer generates a plurality of rows of jet drop streams which deposit drops along helical, interlacing print lines. The Martin printer includes a document scanner which alternately scans the document from top to bottom and from bottom to top on successive printing operations. The print head is shifted alternately from left to right and from right to left during successive printing operations. The Martin printer utilizes a servo drive mechanism to control shifting of the print head.

Accordingly, it is seen that there is a need for a simple reliable ink jet printer in which the print head is shifted laterally with respect to a sheet supporting drum, which is capable of printing during movement of the print head in either direction, and in which the print head is accurately positioned during printing.

SUMMARY OF THE INVENTION

An ink jet printer for depositing ink drops from a plurality of jet drop streams along a plurality of parallel adjacent print lines on a sheet of paper includes a sheet supporting drum and means for rotating the drum. The print head means is slidably mounted adjacent the drum for linear movement in a direction parallel to the axis of rotation of the drum. The print head means generates a plurality of jet drop streams directed toward the drum, with adjacent streams being spaced apart in a direction parallel to the axis of rotation of the drum by a distance greater than the distance between the adjacent print lines on the sheet of paper. A rotatable cam means defines a continuous endless camming surface and a cam drive means interconnects the rotatable cam means and the means for rotating the drum. The cam drive means rotates the rotatable cam means. A cam follower means follows the continuous camming surface and moves the print head means in a direction parallel to the axis of rotation of the paper supporting drum such that jet streams are directed to deposit drops along respective ones of the print lines during successive rotations of the drum.

The cam follower means may comprise a cam follower roller, and a cam follower lever having the roller mounted at a first end thereof, with the lever being pivotally mounted at a second end thereof. The lever is pivotable in a plane substantialy perpendicular to the direction of movement of the print head means. The cam follower means further comprises a motion reducing lever member which contacts the cam follower lever and is pivotable, in response to movement of the cam follower lever, in a plane substantially perpendicular to the plane in which the cam follower lever pivots. The cam follower means further includes linkage means pivotally attached to the motion reducing lever member and to the print head means, for moving the print head means in response to pivoting of the lever member, whereby rotation of the cam means results in linear movement of the print head means.

The printer may further comprise spring means for spring biasing the print head means in a direction away from the linkage means such that the spring means takes up the slack in the elements comprising the cam follower means.

The cam follower lever defines a first lever contacting surface and the motion reducing lever member defines a second lever contacting surface. The second lever contacting surface contacts the first lever contacting surface, whereby pivoting of the cam follower lever about the second end thereof causes the motion reducing lever member to pivot.

The rotatable cam means may be rotated at a rate which is a submultiple of the rate at which the drum is rotated, with rotation of the rotatable cam means being synchronized with rotation of the drum. The camming surface may be configured such that the print head means is moved at a substantially uniform velocity parallel to the axis of rotation of the drum in a first direction during one-half of a rotation of the rotatable cam means, and at a substantially uniform velocity parallel to the axis of rotation of the drum in a second direction, opposite the first direction, during the other half of a rotation of the rotatable cam means. Successively printed sheets are thereby printed with the print head means moving in opposite directions.

Accordingly, it is an object of the present invention to provide an ink jet printer in which lateral shifting of a print head in a direction parallel to the axis of rotation of a paper supporting drum is effectuated by a cam follower means following an endless camming surface on a rotatable cam; and to provide such a printer in which the cam is rotated by the drive which rotates the drum; to provide such a printer in which the cam follower means includes a motion reducing arrangement for shifting the print head by a distance substantially less than the movement imparted to the cam follower means by the cam.

DETAILED DESCRIPTION OF THE PREFERRED EMBODIMENT

Figure 1:
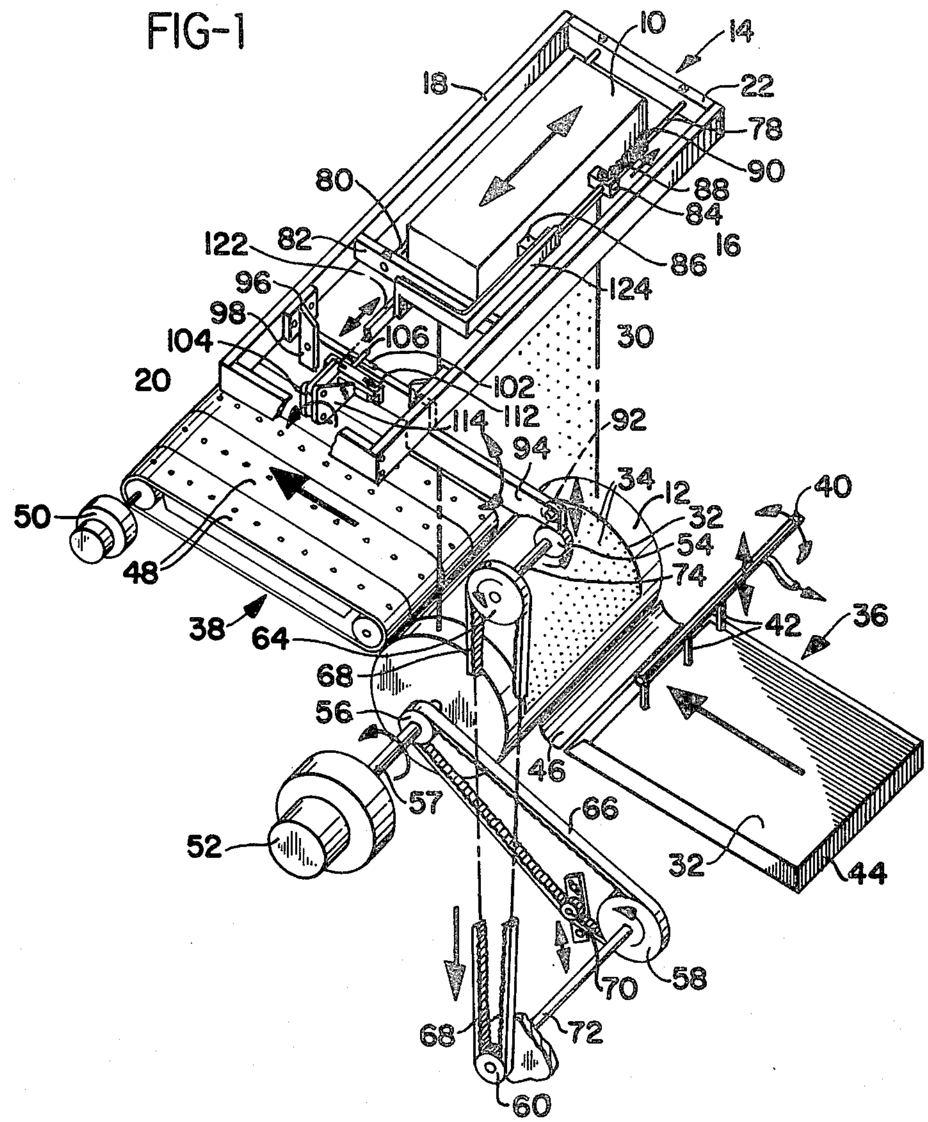
FIG. 1 is a perspective exploded view of the ink jet printer of the present invention, with portions broken away.
Figure 2:
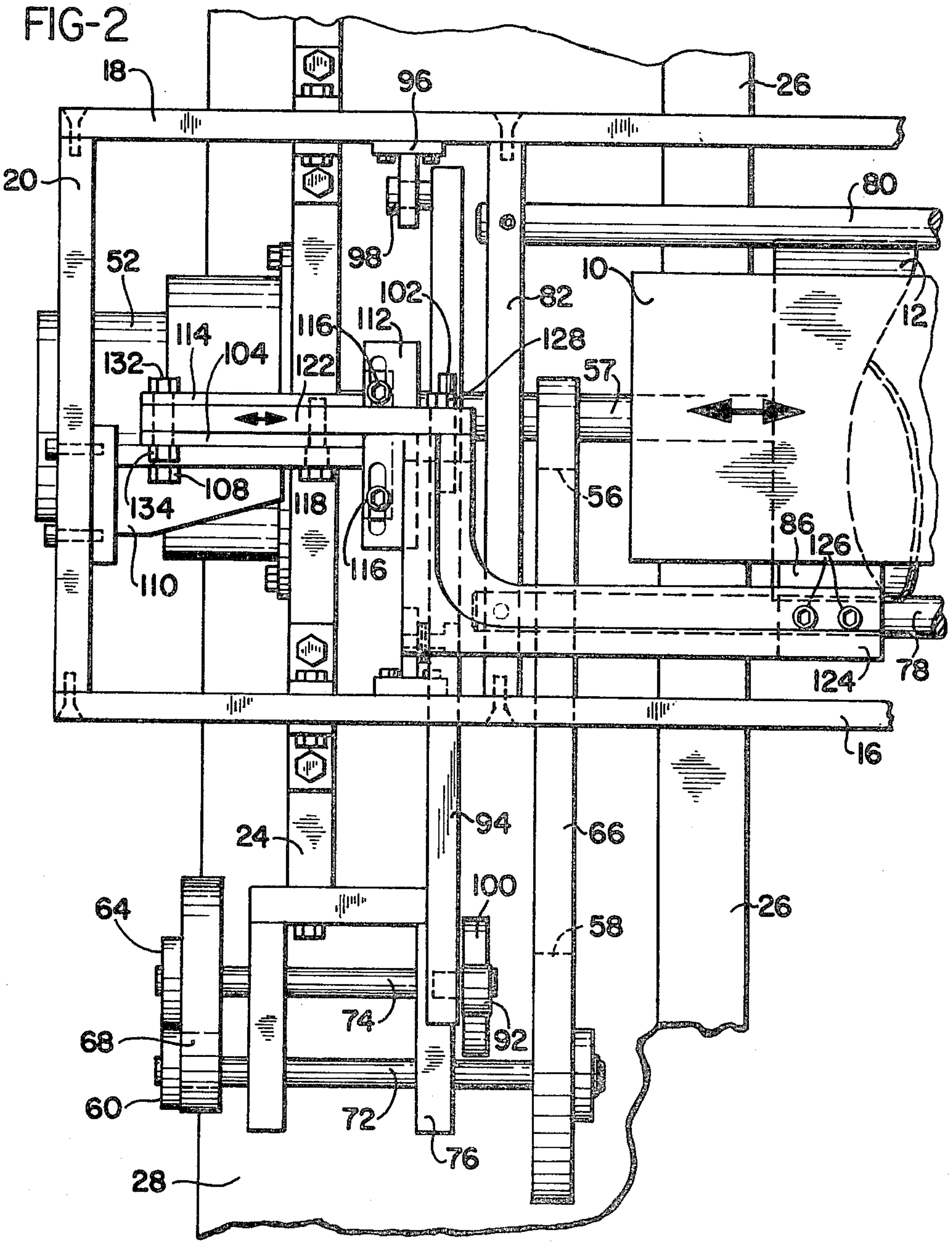
FIG. 2 is a plan view of the printer with portions broken away.
Figure 3:
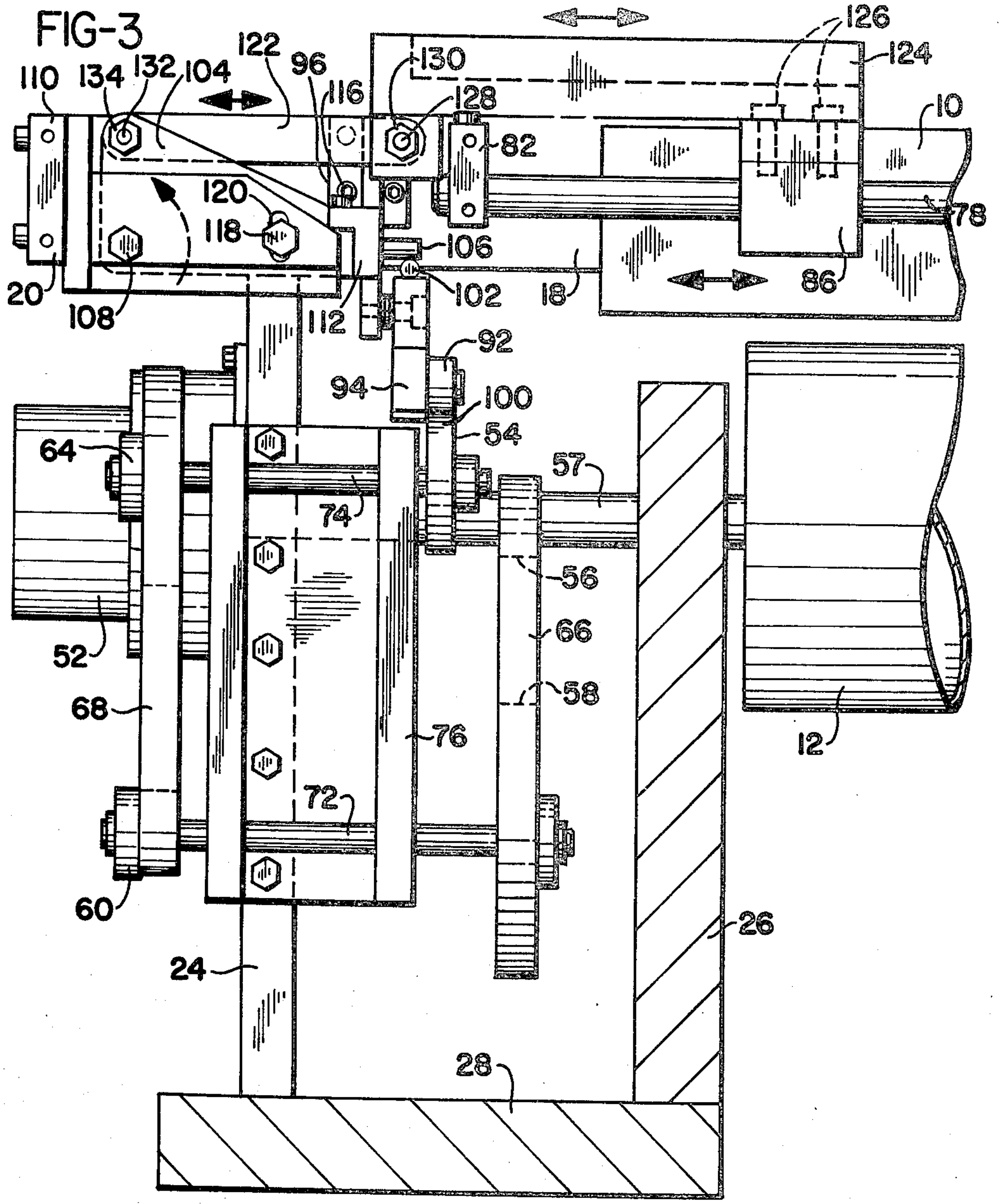
FIG. 3 is a front view of the printer with portions removed and in section.

The present invention relates to an ink jet printer and, more particularly, to such a printer in which printing is accomplished on a sheet of paper mounted on a rotating drum, with a print head moving parallel to the axis of rotation of the drum to effect printing along a plurality of print lines during a plurality of rotations of the drum. Reference is made of FIGS. 1-3 which illustrate the printer of the present invention. FIG. 1 is an exploded perspective view with a portion of the support structure removed for the sake of clarity. Print head 10 is mounted adjacent paper supporting drum 12 within a stationary frame 14 formed of frame elements 16, 18, 20, and 22. FIG. 2 is a plan view of the left hand portion of the printer of FIG. 1, and FIG. 3 is a front view of the printer with frame member 16 removed for clarity of illustration. As seen in FIGS. 2 and 3, the frame 14 is mounted on plates 24, only the left hand plate being illustrated, which plates are attached to major support plates 26 and 28.

The print head 10 is linearly movable in a direction parallel to the axis of rotation of the drum 12 and generates a plurality of jet drop streams, indicated generally at 30, which are directed downward to strike a sheet of paper 32 which is mounted on drum 12. Each jet drop stream 30 deposits drops along an associated print line 34 on sheet 32. The print lines 34 printed during one rotation of the drum 12 are spaced apart in a direction parallel to the axis of rotation of the drum 12 by a distance which is greater than the distance between adjacent print lines in the completely printed copy. By moving the print head 10 laterally as indicated during each of a number successive rotations of the drum 12, each jet prints a band of print lines on the sheet 32, with adjacent bands of print lines being printed by adjacent jets 30. Thus, the print head 10 need only be shifted laterally during the printing operation in a direction parallel to the axis of rotation of the drum 12 by a distance equal to the spacing between adjacent jets.

Although only a single row of jets is illustrated, it may be desirable to utilize a print head which generates two parallel rows of jets with print lines serviced by jets in one row interlacing with those serviced by the jets in the other row. In any event, each jet will deposit drops along a band of adjacent print lines.

A sheet supply means, indicated generally at 36 and a sheet removal means, indicated generally at 38, supply sheets of paper to the drum and remove successively printed sheets of paper from the drum. The print head means 10 is moved in opposite directions during printing of successive sheets. It will be appreciated that such an arrangement requires either a re-ordering of print control data for printing of successive copies or rescanning of an original document in a different scanning format during successive printing operations. On such scanning arrangement is shown in U.S. patent application, Ser. No. 075,063, filed on even date herewith, and assigned to the assignee of the present invention.

The sheet supply means may comprise a vacuum manifold 40 having a plurality of vacuum tubes 42 which engage a sheet of paper 32 in tray 44. Vacuum manifold 40 is then rotated and, along with sheet guide 46, presents a sheet to drum 12. Drum 12 may advantageously define a plurality of vacuum openings in the surface thereof to which a partial vacuum is applied such that a sheet of paper supplied to the drum 12 is securely held on the drum surface during the printing operation as the drum is rotated. After printing, the sheet 32 may be removed from the drum 12 by means of vacuum belts 48 which are driven by motor 50. A sheet supply and removal arrangement, such as shown in copending U.S. patent application, Ser. No. 007,999, filed Jan. 31, 1979, and assigned to the assignee of the present invention may also be utilized. Alternatively, any known sheet supply and removal arrangement capable of supplying sheets of paper successively to a rotating vacuum drum, and removing the sheets therefrom, may be utilized.

Drum 12 is driven at a substantially constant rate by motor 52. A rotatable cam 54 defines a continuous, endless camming surface and is driven by a cam drive means which interconnects the cam 54 with the drum drive mechanism including motor 52. The cam drive means includes timing pulleys 56, 58, 60, and 64 and timing belts 66 and 68. As drum 12 is rotated, pulley 56, fixed on shaft 57, drives pulley 58 via belt 66, the tension of which is adjusted by a slack take-up pulley 70. Pulleys 58 and 60 are keyed to shaft 72 such that pulley 60 is rotated as pulley 58 is rotated. Similarly, pulley 64 is keyed to shaft 74 and drives cam 54. Thus, cam 54 is driven synchronously in a fixed rotational speed relationship with respect to drum 12. As is seen in FIGS. 2 and 3, shafts 72 and 74 extend through bracket 76. Bearing arrangements may be provided in brackets 76 to facilitate rotations of shafts 72 and 74.

Print head 10 is mounted for linear movement within support frame 14 in the direction indicated by means of parallel rods 78 and 80 which extend between frame element 22 and brace 82. A pair of linear bearings 84 and 86, mounted on print head 10, engage rod 78 and permit the print head 10 to slide along the rod. Similarly, a roller (not shown) mounted on the opposite side of the print head 10, engages rod 80, rolling along the rod and permitting movement of the print head 10 in a direction parallel to rods 80 and 78. Spring means, including spring 88, engages the top of linear bearing 84 and a screw 90, threaded into rod 78, such that the spring 88 is held in tension and biases the print head 10 generally to the right, as seen in FIGS. 2 and 3.

Acting against the spring bias force of spring 88 is a cam follower means which follows the continuous camming surface of cam 54 and moves the print head 10 parallel to the axis of rotation of the paper supporting drum 12, such that the jet streams 30 are directed to deposit drops along respective ones of the print lines during successive rotations of the drum 12. The cam follower means includes a cam follower roller 92 and a cam follower lever 94. The roller 92 is mounted at a first end of lever 94. Lever 94 is pivotally mounted at a second end thereof to bracket 96 by pivot bolt 98. Lever 94 is pivotable in a plane which is substantially perpendicular to the direction of movement of the print head 10. Roller 92 follows the endless camming surface 100 of cam 54 such that the first end of lever 94 is raised and lowered by rotation of cam 54.

Attached to the upper portion of lever 94 is pin 102 which defines a first lever contacting surface. A generally triangular shaped motion reducing lever member 104 includes a pin 106 which defines a second lever contacting surface. Pins 102 and 106 are positioned generally perpendicular to each other such that as lever 94 is pivoted upward, motion reducing lever member 104 is also pivoted upward. Lever member 104 pivots about pivot bolt 108 which extends through support bracket 110 mounted on frame element 20. Motion reducing lever member 104 includes pin adjustment block 112 in secured to the generally triangular portion 114 of the motion reducing lever member 104 by means of bolts 116. By adjusting the position of block 112, the point of contact between pins 102 and 106 may be adjusted. Triangular portion 114 also includes bolt 118 extending through slot 120 in bracket 110. Bolt 118 ensures that the motion reducing lever member 104 pivots in a plane substantially perpendicular to the plane in which the cam follower lever 94 pivots.

A linkage means, comprising link 122, is pivotally attached to the motion reducing lever member 104 and to an L-shaped bar 124 which forms a part of print head 10. Bar 124 is rigidly attached to linear bearing 86 by means of bolts 126 and pivotally attached to link 124 by bolt 128 and nut 130. Link 122 is pivotally attached to motion reducing lever member 104 by means of bolt 132 and nut 134. Link 122 extends through a channel defined by triangular portion 114 such that portion 114 does not contact the link 122.

As is apparent, as the cam 54 is rotated, the lever 94 pivots vertically in dependence upon the shape of the camming surface 100. This vertical movement is transferred to the motion reducing lever member 104 as a result of the contact between pins 102 and 106. It will be appreciated, therefore, that by shifting adjusting block 112, this point of contact may be adjusted and, therefore, the lever reduction of the fluctuations in the camming surface contour transferred to the motion reducing lever member 104 by lever 94 may be adjusted.

Figure 4:
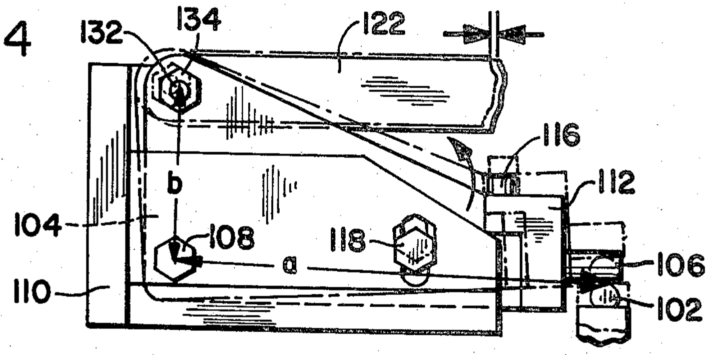
FIG. 4 is an enlarged view of a portion of the cam follower means, illustrating motion reduction.

Lever member 104 provides a further motion reduction since, as illustrated in FIG. 4, the distance "a" between the point of contact of pins 102 and 106 and pivot bolt 108 is substantially greater than the distance "b" between bolt 132, by which link 122 is connected to motion reducing lever member 104, and pivot bolt 108. Thus, both lever 94 and lever member 104 provide a reduction of the effect which variations in the camming surface of cam 94 have upon the linear movement of the print head 10.

As an example, where a sheet of paper is being printed during four successive rotations of the drum 12 with each jet servicing four adjacent print lines, it is only necessary to shift the print head 10 by a distance equal to the spacing between the centers of the first and last of the four print lines, on the order of 0.007 inches, where 2 mil drops are being deposited along the print lines. Thus, if a total cam rise of 0.07 inches is provided in cam 54, the lever 94 and the lever member 104 provide approximately a 10-to-1 motion reduction. The cam surface may be configured such that the print head is moved laterally in either direction at a substantially uniform velocity, thus printing along helical print lines. Alternatively, the print head may be moved a discrete distance after each rotation such that the print lines are circumferential.

The link 122 is generally held in tension by the spring bias force of spring 88, regardless of the direction of movement of the print head 10. Thus, spring 88 continuously urges roller 92 against cam 54, via linkage 122, lever member 104, and lever 94, with the result that slack in the cam follower means is taken up completely by the spring 88.

By driving the cam 54 from the same drive mechanism utilized for drum 12, synchronism is provided between rotation of the drum 12 and rotation of the cam 54. Where a sheet of paper is printed during a plurality of rotations of the drum 12, with successive sheets being printed with the print head 10 moving in opposite directions, the drum 12 will be rotated at a rate which is a multiple of the rate at which cam 54 is rotated. As an example, drum 12 may be rotated at 8 rotations per second with successive sheets being printed during four rotations of the drum. Thus, two sheets will be printed each second. Cam 54 may be designed such that the print head 10 is shifted in a first direction during one-half of the rotation of the cam and the print head is shifted in the opposite direction during the other half of the rotation of the cam. With such an arrangement, cam 54 is rotated at one rotation per second. It will be further appreciated that the cam 54 may be rotated at a slower rate with respect to the drum 12 if the camming surface 100 configured accordingly.

Errors in print head position, if any, with the arrangement of the present invention, are gradually accumulated during print head travel. Although the position of an individual print line may be displaced slightly from its desired position, the positions of adjacent print lines will also be similarly displaced, with the result that no significant discontinuities in the printed image are produced. Consequently, the quality of the print image is generally superior to that produced by a printer in which the print head is shifted laterally by means of a stepper motor or servo motor. Additionally, such a mechanical linkage arrangement according to the present invention between the drum drive and the print head for shifting the print head in synchronization with rotation of the drum results in a highly reliable printer.

While the form of apparatus herein described constitutes a preferred embodiment of the invention, it is to be understood that the invention is not limited to this precise form of apparatus, and that changes may be made therein without departing from the scope of the invention.

What is claimed is:

1. An ink jet printer for depositing ink drops from a plurality of jet drop streams along a plurality of parallel adjacent print lines on a sheet of paper, comprising:
- a sheet supporting drum,
- means for rotating said drum,
- print head means, slidably mounted adjacent said drum for linear movement in a direction parallel to the axis of rotation of said drum, said print head means generating a plurality of jet drop streams directed toward said drum, with adjacent streams being spaced apart in a direction parallel to the axis of rotation of said drum by a distance greater than the distance between adjacent print lines on said sheet of paper,
- rotatable cam means defining a continuous camming surface,
- cam drive means, interconnecting said rotatable cam means and said means for rotating said drum, for rotating said rotatable cam means, and
- cam follower means for following said continuous camming surface and moving said print head means in a direction parallel to the axis of rotation of said paper supporting drum, said cam follower means comprising motion reducing means for moving said print head means in a direction parallel to the axis of rotation of said paper supporting drum by a distance substantially less than the distance which said cam follower means is moved by said rotatable cam means, such that said jet streams are directed to deposit drops along respective ones of said print lines during successive rotations of said drum.

2. The ink jet printer of claim 1 in which said cam follower means comprises:
- a cam follower roller,
- a cam follower lever having said roller mounted at a first end thereof and pivotally mounted at a second end thereof, said lever being pivotable in a plane substantially perpendicular to the direction of movement of said print head means,
- a motion reducing lever member, contacting said cam follower lever and being pivotable, in response to movement of said cam follower lever, in a plane substantially perpendicular to the plane in which said cam follower lever pivots,
- linkage means, pivotally attached to said motion reducing lever member and to said print head means, for moving said print head means in response to pivoting of said lever member, whereby rotation of said cam means results in linear movement of said print head means.

3. The ink jet printer of claim 2, further comprising spring means for spring biasing said print head means in a direction away from said linkage means such that said spring means takes up the slack in said cam follower means.

4. The ink jet printer of claim 2 in which said cam follower lever defines a first lever contacting surface and in which said motion reducing lever member defines a second lever contacting surface, said second lever contacting surface contacting said first lever contacting surface, whereby pivoting of said cam follower lever about said second end thereof causes said motion reducing lever member to pivot.

5. An ink jet printer for depositing ink drops along a plurality of adjacent print lines on a sheet of paper to form a print image thereon, comprising:
- a sheet supporting drum,
- means for rotating said drum,
- ink jet print head means, slidably mounted adjacent said drum, for generating a plurality of jet drop streams depositing drops simultaneously along evenly spaced, non-adjacent print lines, said print head means being movable in a direction parallel to the axis of rotation of said sheet supporting drum,
- rotatable cam means defining an endless camming surface,
- means for rotating said cam means at a rate which is a submultiple of the rate at which said drum is rotated and in synchronism with rotation of said drum,
- cam follower means for following said camming surface and moving print head means in a direction parallel to the axis of rotation of said drum during each rotation of said drum by a distance equal to the spacing between adjacent print lines on said sheet of paper, whereby printing is accomplished across a sheet of paper mounted on said drum with each of said jet drop streams depositing drops on an associated band of adjacent print lines.

6. The ink jet printer of claim 5 in which said cam follower means comprises motion reducing means for moving said print head means in a direction parallel to the axis of rotation of said drum by a distance substantially less than the distance which said motion reducing means is moved by said rotatable cam means.

7. The ink jet printer of claim 5 in which said endless camming surface is configured such that said print head means is moved at a substantially uniform velocity parallel to the axis of rotation of said drum in a first direction during one-half of a rotation of said rotatable cam means and at a substantially uniform velocity parallel to the axis of rotation of said drum in a second direction, opposite said first direction, during the other half of a rotation of said rotatable cam means, whereby successively printed sheets are printed with said print head means moving in opposite directions.

8. The ink jet printer of claim 5 in which said cam follower means is connected to said print head means at one end thereof to pull said print head means in a first direction and in which said printer further comprises spring means applying a spring biasing force to said print head means, urging said print head means in a second direction, opposite said first direction.

9. An ink jet printer, comprising:

a sheet supporting drum, means for rotating said drum, print head means, mounted adjacent said drum for movement parallel to the axis of rotation of said drum, said print head means generally a plurality of jet drop streams directed at said drum, rotatable cam means defining an endless camming surface and drivingly connected to said means for rotating said drum, spring means applying a spring bias force to said print head means, urging said print head means in a first direction parallel to the axis of rotation of said drum, cam follower means, connected to said print head means and urged into contact with said endless camming surface by said spring bias force acting on said print head means, for applying a force to said print head means in a second direction, opposite to said first direction, whereby said print head means is moved in said first and second directions in dependence upon the rotation of said rotatable cam means.

10. The ink jet printer of claim 9 further comprising:

sheet supply means for loading a sheet of paper onto said sheet supporting drum, and sheet removal means for removing a sheet of paper from said sheet supporting drum.

11. The ink jet printer of claim 9 in which said drum is rotated at a rate which is an integer multiple of the rate at which said rotatable cam means is rotated.

12. The ink jet printer of claim 10 in which a plurality of sheets of paper are supplied to said sheet supporting drum, printed, and thereafter removed from said drum during each rotation of said rotatable cam means.

13. The ink jet printer of claim 12 in which said plurality of sheets of paper is an integer number of sheets of paper.

14. The ink jet printer of claim 9 in which said cam follower means comprises:

a cam follower roller contacting said endless camming surface and movable substantially radially with respect to said rotatable cam means, and motion reducing means, mounting said cam follower roller and connected to said print head means, for moving said print head means parallel to the axis of rotation of said drum in response to movement of said cam follower roller, said movement of said print head means being substantially less than the movement of said cam follower roller.

* * * * *